(12) United States Patent
Simske et al.

(10) Patent No.: US 10,225,432 B2
(45) Date of Patent: Mar. 5, 2019

(54) FACILITATING AUTHENTICATION OF A VOID PANTOGRAPH

(71) Applicant: Hewlett-Packard Development Company, L.P., Houston, TX (US)

(72) Inventors: Steven J Simske, Fort Collins, CO (US); Jason S Aronoff, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 24 days.

(21) Appl. No.: 15/506,682

(22) PCT Filed: Aug. 29, 2014

(86) PCT No.: PCT/US2014/053534
§ 371 (c)(1),
(2) Date: Feb. 24, 2017

(87) PCT Pub. No.: WO2016/032527
PCT Pub. Date: Mar. 3, 2016

(65) Prior Publication Data
US 2017/0289388 A1    Oct. 5, 2017

(51) Int. Cl.
*H04N 1/32* (2006.01)
*H04N 1/00* (2006.01)

(52) U.S. Cl.
CPC ..... *H04N 1/32144* (2013.01); *H04N 1/00883* (2013.01)

(58) Field of Classification Search
None
See application file for complete search history.

(56) References Cited

U.S. PATENT DOCUMENTS

| | | | |
|---|---|---|---|
| 7,894,103 B2 | 2/2011 | Wang et al. | |
| 8,355,180 B2 | 1/2013 | Wu et al. | |
| 2006/0145469 A1 | 7/2006 | Lubrino et al. | |
| 2011/0310441 A1 | 12/2011 | Simske | |
| 2012/0254052 A1* | 10/2012 | Gao | B42D 25/305 705/318 |
| 2013/0166464 A1* | 6/2013 | Schneider | G06Q 10/087 705/318 |
| 2013/0306737 A1 | 11/2013 | Freeman | |
| 2014/0105449 A1 | 4/2014 | Caton et al. | |
| 2014/0151454 A1 | 6/2014 | Pawlik et al. | |

OTHER PUBLICATIONS

Phillips, G.K. "New Digital Anti-copy/Scan and Verification Technologies", Feb. 26, 2004.

\* cited by examiner

*Primary Examiner* — Andrew H Lam
(74) *Attorney, Agent, or Firm* — HP Inc. Patent Department

(57) ABSTRACT

Examples herein disclose receiving and identifier associated with a first void pantograph and identifying a second void pantograph based on the received identifier. The examples facilitate authentication of the first void pantograph by making available the second void pantograph.

14 Claims, 7 Drawing Sheets

FACILITATING AUTHENTICATION OF A VOID PANTOGRAPH

BACKGROUND

In security printing, a void pantograph refers to a method of making copy-evident patterns in a background of a document. These patterns are invisible to the untrained human eye, but visibly stand out when the document is scanned and/or photocopied.

BRIEF DESCRIPTION OF THE DRAWINGS

In the accompanying drawings, like numerals refer to like components or blocks. The following detailed description references the drawings, wherein.

DETAILED DESCRIPTION

Figure 1:
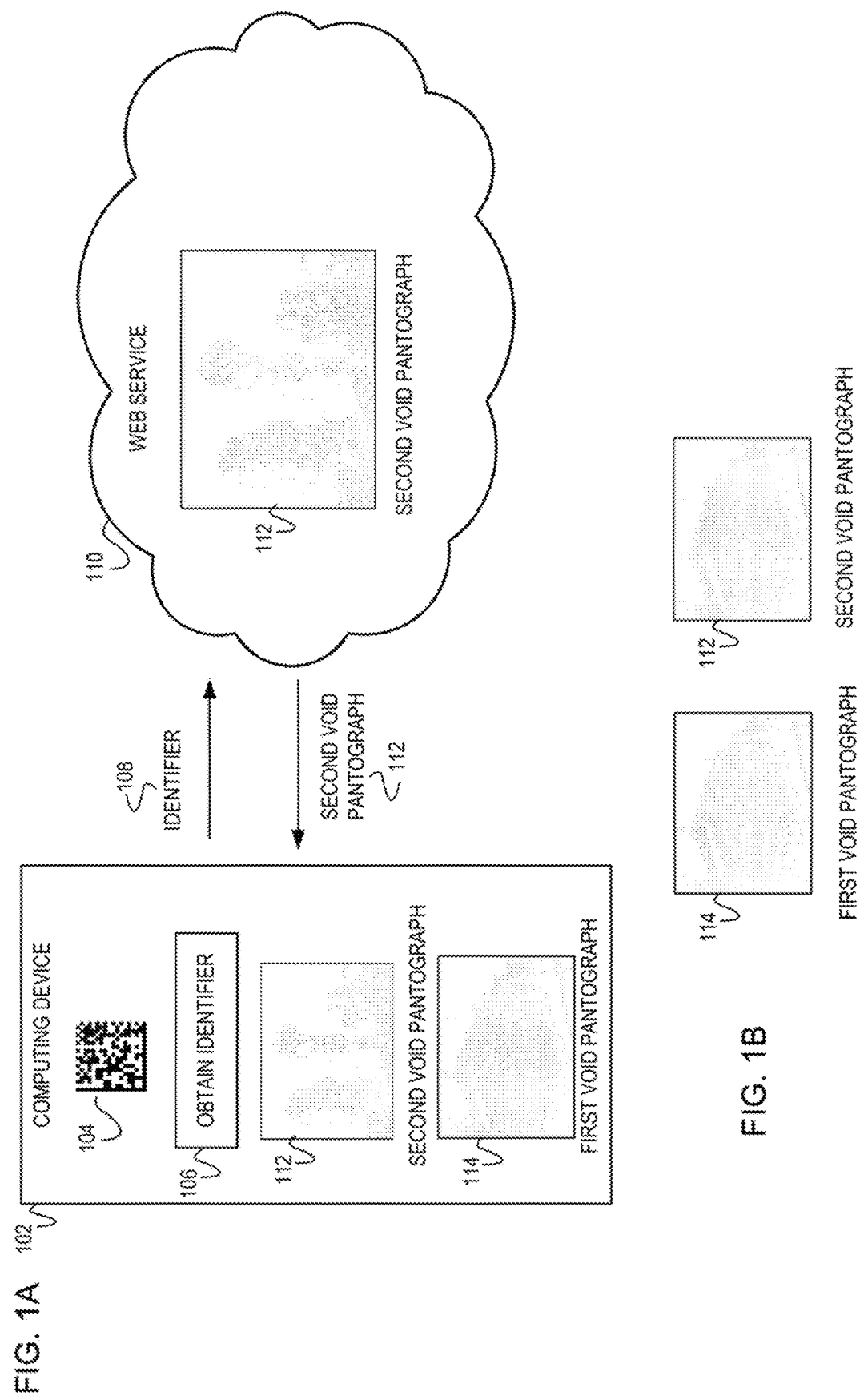
FIG. 1A is a block diagram of an example system including a computing device and a web service, the computing device processes machine-readable data to obtain an identifier for identification of a second void pantograph which is used to invalidate the authentication of a first void pantograph at the computing device.
FIG. 1B is a block diagram illustrating example patterns from a first void pantograph and a second void pantograph which are used to validate the first void pantograph, accordingly.

Counterfeit items may not be readily detectable as it may be infeasible for a user to differentiate a genuine item from a counterfeit item. For example, a drug bottle may include a hologram or other security mechanism for the user to detect if the bottle is genuine. It may be difficult for the user to detect which hologram may be the genuine hologram. Additionally, other counterfeit mechanisms may be easier for a counterfeiter to reproduce. For example, if there is a particular phrase such as "void," the counterfeiter may be able to easily reproduce this phrase.

To address these issues, examples disclosed herein provide a security mechanism of using a void pantograph as a means of detecting if an item is counterfeit. The void pantograph is an image which includes a pattern that becomes visible upon scanning and/or photocopying the void pantograph. The item may include a document, label, packaging, or other sort of material which is associated with a first void pantograph and machine-readable data. As such, the first void pantograph may be suitable for hiding in a background of a document, package, the machine-readable data, or other surface for being able to authenticate the item.

The examples scan the machine-readable data related to the item, the machine-readable data contains an identifier which is unique to a second void pantograph. The identifier is transmitted for a web service to identify the corresponding void pantograph (e.g., the second void pantograph). The web service, in turn, utilizes the identifier to further identify the second void pantograph. The second void pantograph facilitates the authentication of the first void pantograph, and hence the item by making the second void pantograph available to the computing device. The web service may provide the second pantograph and/or a link to the second void pantograph so the first void pantograph may be authenticated. Using the void pantographs to facilitate authentication provides an anti-counterfeiting measure to validate whether the item is genuine or whether the item may be counterfeit. Additionally, the void pantographs provide an accessible means for a consumer to validate the item. Further, it may be more difficult to reproduce the exact void pantographs as the would-be counterfeiter should need both a valid identifier and the correct first void pantograph combination for each counterfeit item. This further provides a deterrent to prevent counterfeiting.

The examples disclose upon receiving the identifier, the web service constructs the second void pantograph from a digital file in such a manner that the pattern in the second void pantograph becomes visible without scanning and or photocopying. The pattern in the second void pantograph may become visible on the computing device for the consumer to authenticate the item. In this example, the first void pantograph may be scanned and/or photocopied to make the pattern within the first void pantograph visible. Using these patterns, the consumer may easily detect whether the first void pantograph is genuine and whether the item is authentic. For example, if the patterns in the first void pantograph and the second void pantograph are similar and/or related, this indicates to the consumer the item is genuine and authentic. If the patterns in the first void pantograph and second void pantograph are dissimilar, this indicates the new is not authentic and thus may be counterfeit, subjected to package reuse, etc.

Examples discussed herein provide accessible means to validate an item through authentication of a void pantograph. Additionally, the authentication of the void pantograph provides an anti-counterfeiting measure as a correct combination of a first void pantograph and identifier would make it difficult for a would-be counterfeiter to reproduce.

Referring now to the figures, FIG. 1A is a block diagram of an example system including a computing device 102 to scan machine-readable data 104 to obtain an identifier at module 106. A first void pantograph 114 may be hidden in a background of the machine-readable data 104 or may be separate from the machine-readable 104 and may be include in a label, package, document, or other type of surface associated for authenticating an item. The first void pantograph 114 is associated with the machine-readable data 104 and hence the identifier 108 as this data may be related to an item in which the user may desire to authenticate. For example, a package and/or document related to the item may include the machine-readable data 104 conveying information about the identifier 108 and the first void pantograph 114. Upon obtaining the identifier 108 from processing the machine-readable data 104, the computing device 102 transmits the identifier 108 to a web service 110. The web service 110 receives the identifier 108 for use of identifying the second void pantograph 112. Upon identifying the second void pantograph 112, the web service 110 transmits the second void pantograph 112 to the computing device 102. The second void pantograph 112 is used for authentication of the first void pantograph 114 by the computing device 102. The computing device 102 is an electronic device that may be programmed to carry out a set of operations and/or functions. As such, the computing device 102 may include a processor and/or controller in which to carry out the set of operations and/or functions. Implementations of the computing device 102 include a target device, mobile device, client device, personal computer, desktop computer, laptop, tablet, video game console, or other type of electronic device capable of scanning the machine-readable data 104 to obtain the identifier 108. Although the computing device 102 includes components 104, 106, 112, and 114 implementations should not be limited as this was done for illustration purposes. For example, the computing device 102 as in FIG. 1A may also include a scanning mechanism such as a camera, barcode reader, etc.

The machine-readable data 104 is a machine-readable representation of data which conveys information, such as the identifier 108. As such, implementations of the machine-readable data 104 include a matrix mark, barcode, graphical alphanumeric, alphanumeric, logo, label, quick response (QR) code, and a stocking keeping unit (SKU) code, or other data-carrying object capable of conveying the identifier 108. For example, as illustrated in FIG. 1A, the machine-readable data 104 is illustrated as a two-dimensional matrix mark, this mark holds identifier "8000630DE20000001," which in a database on the web service 110 corresponds to the second void pantograph 112.

At module 106, the computing device 102 obtains the identifier 108 by processing the machine-readable data 104. In this example, the machine-readable data 104 contains the identifier 108 which is unique to the second void pantograph 112. Including the identifier 108 as unique to the second void pantograph 112 enables the web service 110 to identity the second void pantograph 112 among multiple void pantographs. The module 106 may include an instruction, set of instructions, process, operation, logic, technique, function, firmware, and/or software executable by the computing device 102 to obtain the identifier 108 from the machine-readable data 104.

The identifier 108 is a representation within the machine-readable data 104 which enables the identification of the second void pantograph 112. The identifier 108 is readable upon the processing of the machine-readable data 104, meaning the identifier may be hidden to a human eye. The identifier 108 contains information which is unique to the second void pantograph 112, thus enabling the web service 110 to identify the second void pantograph 112 from the identifier 108. Implementations of the identifier 108 include, by way of example, a binary mark, value, bit string, binary-string embedded print mark, token, data value, serial number, universally unique identifier, or other type of identifying information capable of distinguishing the second void pantograph 112 among other void pantographs.

The web service 110, also referred to as a server, receives over a network the identifier 108. Upon receiving this identifier 108, the web service 110 identifies the corresponding void pantograph (e.g., second void pantograph). The web service 110 identifies the second void pantograph 112 through retrieval by a database or by generating the second void pantograph 112 in response to receiving the identifier. The database may include multiple void pantographs, each void pantograph with a unique identifier. Thus using the identifier 108, the web service 110 can retrieve the second void pantograph 112. The web service 110 generates the second void pantograph 112 based on the received identifier 108 from the computing device 102. In this example, the web service 110 has the capability of generating multiple void pantographs based on the identifier 108. The web service 110 generates the second void pantograph 112 and tracks which identifier corresponds to which void pantograph. The web service 110 is an instance of a service capable of accepting and giving a response accordingly. As such, the web service 110 is located on the server to provide and may include implementations, by way of example, a web server, web service, computing system, network server, network computer, or other type of computing device capable of receiving the identifier 108 and identifying the second void pantograph 112.

The first void pantograph 114 is an image which contains a pattern that becomes visible once the first void pantograph 114 is canned and/or photocopied. The visibility of the pattern within the first void pantograph 114 enables the authentication of the first void pantograph 114 to the pattern visible in the second void pantograph 112. For example, the pattern made visible from the first void pantograph 114 includes a city hall. In one implementation, when the user desires to authenticate a particular item, the user may visually inspect the patterns of the first void pantograph 114 and the second void pantograph 112 to determine if these patterns are similar or dissimilar. In another implementation, an application connected or residing at the computing device 102 compares the patterns of the first void pantograph 114 and the second void pantograph 112 to determine if these patterns are similar or dissimilar. As such in this implementation, the application may include a capture-type application and/or an output imaging application. For example, in the capture type application, the application at the computing device 102 scans the first void pantograph 114 and uses image processing to discriminate pixels in the background from pixels in the foreground, thereby reproducing the pattern in the first void pantograph 114. In a further example, in the output imaging application, the application analyzes the patterns in both the first void pantograph 114 and the second void pantograph 112 to determine if these patterns are similar or dissimilar. In this example, the output image application may capture the first void pantograph 114 by a camera, scanning device, or other type of image capturing mechanism and images a copy of the original printed material (e.g., the first void pantograph 114).

The second void pantograph 112 is an image which contains a pattern that becomes visible upon availability to the computing device 102. The web service 110 creates a digital file of the second void pantograph 112 which makes the pattern within the second void pantograph 112 visible. In this implementation, the web service 110 connects the identifier to the second void pantograph 112 for identifying the second void pantograph. Additionally, the web service may create a digital file of the second void pantograph for generating the visibility of the pattern at the computing device 102 without scanning and/or photocopying of the second void pantograph 112. For example, the pattern in the second void pantograph 112 includes a balancing rock formation. The second void pantograph 112 is made available to the computing device 102 by transmitting a link and/or the second void pantograph to the computing device 102. The computing device 102 compares the patterns in the first void pantograph 114 and the second void pantograph 112. In this manner, the second void pantograph 112 made available to the computing device 112 makes visible the pattern so the second void pantograph 112 is the copied and/or scanned version of the second void pantograph 112 from the web service 110.

As illustrated in FIG. 1A, the patterns observed in the first void pantograph 114 and the second void pantograph 112 include the city hall and the balancing rock formation, accordingly. This represents the pattern dissimilarity which indicates the item which is disingenuous and as such may be a counterfeit item. The similarity of patterns made visible in the first void pantograph 114 and the second void pantograph 112 is illustrated in FIG. 1B. The similarity of these patterns is used to represent the authentication of the first void pantograph 114 and in turn the authentication of the item.

FIG. 1B is an example illustration of similar patters between the first void pantograph 114 and the second void pantograph 112. For example, both patterns illustrated in the first void pantograph 114 and the second void pantograph 112 include the city ball pattern as depicted above in connection with FIG. 1A. The similarities of these patterns primarily indicate that the first void pantograph 114 is genuine and thus the associated item is considered authentic.

Figure 2:
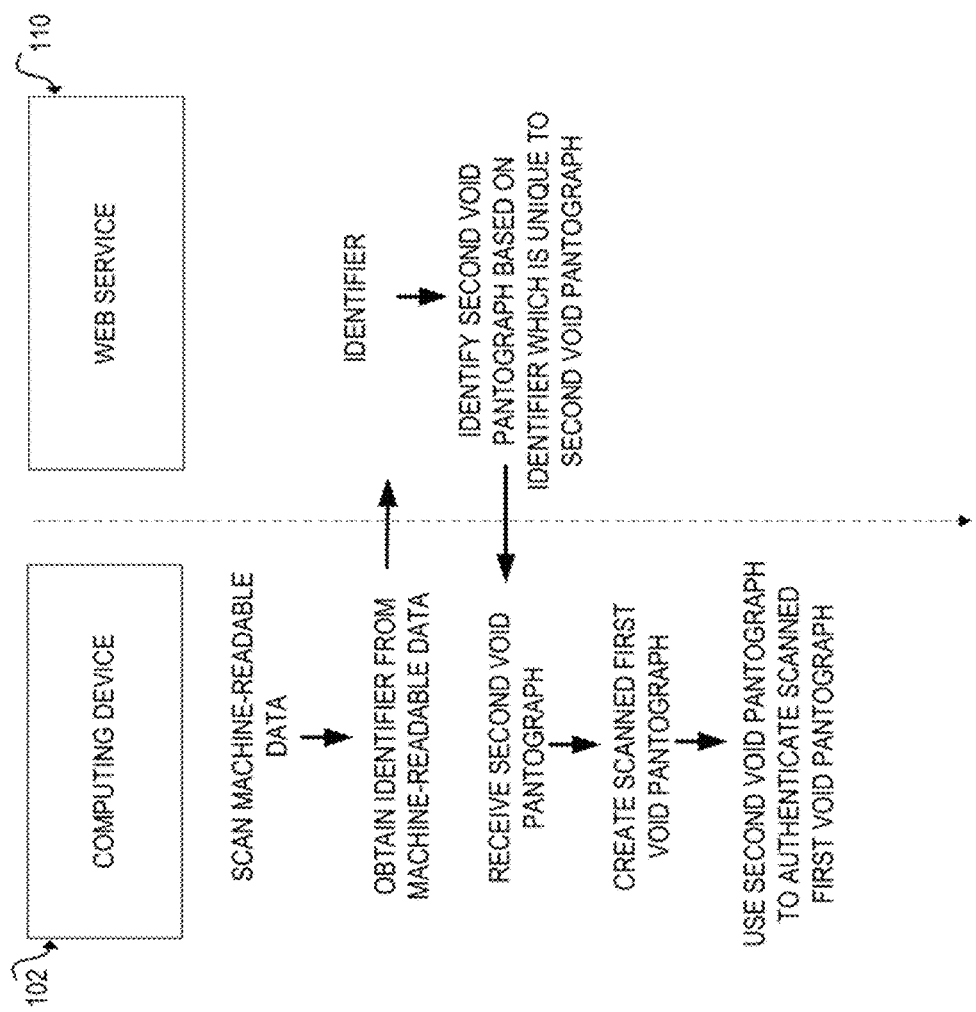
FIG. 2 is a data diagram for example communications between a computing device and a web service for authenticating a first void pantograph through receipt of a second void pantograph.

FIG. 2 is a data diagram depicting example communications between a computing device 102 and a web service 110. The computing device 102 scans tear machine-readable data and proceeds to process the machine-readable data to obtain the identifier. A first void pantograph may be hidden in the machine-readable data, a label, package, document, or may be separately independent from the machine-readable data. Scanning the machine-readable data, the computing device 102 obtains the identifier. The identifier is considered associated with the first void pantograph as this data may be related to an item in which a user desires to authenticate. For example, a package of the item includes the machine-readable data with the identifier and the first void pantograph. In another example, a label of the item includes the machine-readable data with the identifier and the first void pantograph. Upon obtaining the identifier, the computing device 102 proceeds to transmit the identifier to the web service 110. The web service 110 in turn uses this received identifier from the computing device 102 to identify the second void pantograph. The web service 110 identifies the second void pantograph by retrieving from a database of multiple void pantographs or by generating the second void pantograph. This implementation is explained in detail in a later figure. The web service 110 creates a digital file of the second void pantograph which makes a pattern within the second void pantograph visible. Thus the second void pantograph is identified by the web service 110 without separately scanning and or photocopying of the second void pantograph to make the pattern visible. Upon identifying the second void pantograph, the web service 110 transmits the second void pantograph to the computing device 102. The computing device 102 receives the second void pantograph and as such may create a scanned copy of the first void pantograph to make visible a pattern within the first void pantograph. The computing device 102 uses the patterns made visible within the first void pantograph and the second void pantograph to authenticate the first void pantograph. If these patterns are similar, this indicates the first void pantograph is genuine and thus the item is considered authentic. If these patterns are dissimilar, this indicates the first void pantograph may have been compromised and thus the item may be considered counterfeit.

Figure 3:
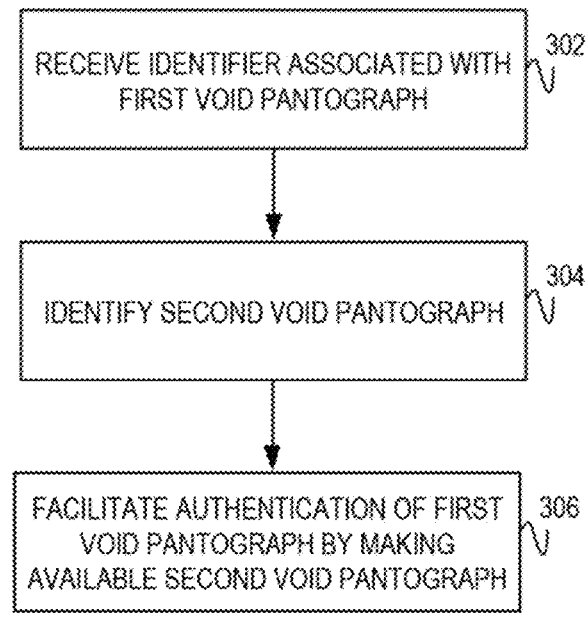
FIG. 3 is a flowchart of an example method, executable by a server, to receive an identifier associated with a first void pantograph for identifying a second void pantograph, the second void pantograph facilitates an authentication of the first void pantograph.

FIG. 3 is a flowchart of an example executable by a server to receive an identifier associated with a first void pantograph from a computing device. The server in turn identifies a second void pantograph. The second void pantograph facilitates an authentication of the first void pantograph. The facilitation occurs by making the second void pantograph available to the computing device. The second void pantograph is made available to the computing device by the server transmitting the second void pantograph to the computing device and/or by transmitting a link to the second void pantograph. In discussing FIG. 3, references may be made to the components in FIG. 1A to provide contextual examples. For example, the web service 110 as in FIG. 1A executes operations 302-306 for receiving the identifier for identifying the second void pantograph for authentication of the first void pantograph of the first void pantograph. As such, the server includes, by way of example, the web server, web service, computing system, network server, network computer, etc. Further, although FIG. 3 is described as implemented by the server, it may be executed on other suitable components. For example, FIG. 3 may be implemented in the form of executable instructions on a machine-readable storage medium 704 as in FIG. 7.

At operation 302, the server receives the identifier from the computing device. The computing device obtains the identifier from machine-readable data to pull out the identifier for transmission to the server. The server receives this identifier for further identifying the second void pantograph as at operation 304.

At operation 304, the server identifies the second void pantograph. In one example, the server retrieves the second void pantograph in a database. In this example, the server utilizes the received identifier from operation 302 to retrieve corresponding second void pantograph. The database may include multiple void pantographs, each void pantograph with a unique identifier. Thus using the identifier, the server can retrieve the second void pantograph. In another example, the server generates the second void pantograph based on the received identifier from operation 302. In this example, the server has the capability of generating multiple void pantographs based on the identifier. The server generates the second void pantograph and tracks which identifier corresponds to each respective void pantograph.

At operation 306, the server facilitates the authentication of the first void pantograph at the computing device by making the second void pantograph available to the computing device. The server makes the second void pantograph available to the computing device by transmitting the second void pantograph itself and/or transmitting a link.

Figure 4:
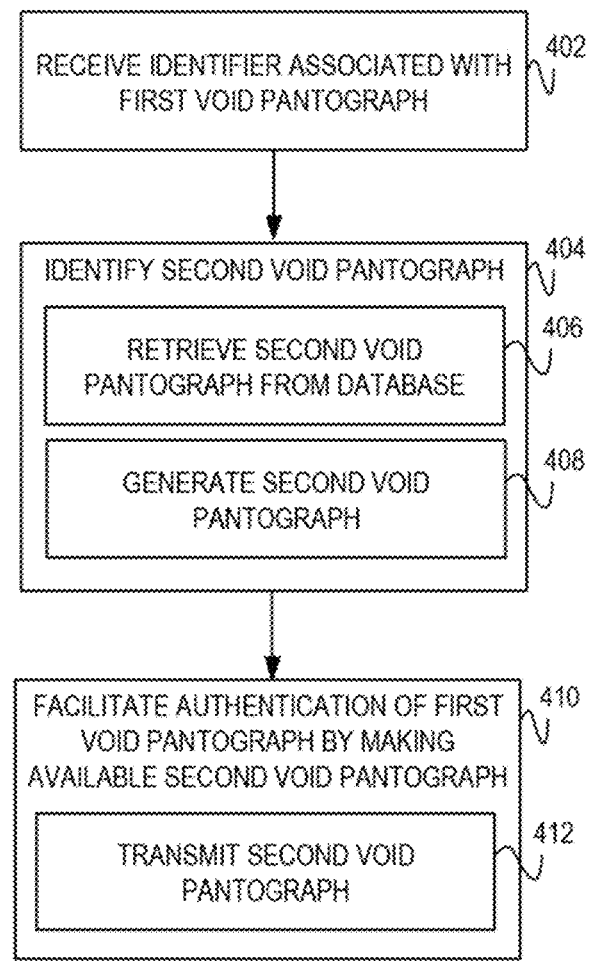
FIG. 4 is a flowchart of an example method, executable by a server, to identify a second void pantograph by retrieving the second void pantograph from a database or generating the second void pantograph from an identifier, the method facilitates an authentication of a first void pantograph by transmitting the second void pantograph.

FIG. 4 is a flowchart of an example method, executable by a server, for receiving an identifier associated with a first void pantograph from a computing device. The identifier is unique to a second void pantograph, thus, receiving the identifier the server identifies the second void pantograph corresponding to the identifier. The server identifies the second void pantograph by either retrieving the second void pantograph from a database of multiple void pantographs or generating the second void pantograph according to the identifier. Upon identification of the second void pantograph, the server facilitates authentication of the first void pantograph at the computing device by making the second void pantograph available to the computing device. In one implementation, the server makes the second void pantograph available to the computing device by transmitting the second void pantograph. In discussing FIG. 4, references may be made to the components in FIG. 1A to provide contextual examples. For example, the web service 110 as in FIG. 1A executes operations 402-412 for receiving the identifier for identifying the second void pantograph for authentication of the first void pantograph at the computing device 102. As such, the server includes, by way of example, a web server, web service, computing system, network server, network computer, etc. Further, although FIG. 4 is described as implemented by the server, it may be executed on other suitable components. For example, FIG. 4 may be implemented in the form of executable instructions on a machine-readable storage medium 704 as in FIG. 7.

At operation 402, the server receives the identifier from the computing device. The computing device processes machine-readable data which holds the identifier. The computing device transmits the identifier to the server for identifying the second void pantograph. Operation 402 may be similar in functionality to operation 302 as in FIG. 3.

At operation 404, the server identifies the second void pantograph. In one example, the server retrieves the second void pantograph from the database of multiple void pantographs at operation 406. In another example, the server generates the second void pantograph based on the identifier as at operation 408. Operation 404 may be similar in functionality to operation 304 as in FIG. 3.

At operation 406, the server retrieves the second void pantograph from the database. Using the received identifier from the computing device, the server accesses the database. The database may include multiple void pantographs each corresponding to a different identifier. Thus using the identifier received at operation 402, the server may identify the second void pantograph from among the multiple void pantographs. Accordingly, the server retrieves the digital file associated with the second void pantograph for transmission at operation 412.

At operation 408, the server generates the second void pantograph. The server may have the capability of generating multiple void pantographs, each pantograph unique to the identifier. Thus when the server generates the digital file for the void pantograph, the server includes a log file and/or database for future reference. In this manner, the server tracks which identifier corresponds to which void pantograph.

At operation 410, the server facilitates the authentication of the first void pantograph by making the second void pantograph available to the computing device. In one example, the server transmits the second void pantograph to the computing device as at operation 412. In another example, the server provides a link for the computing device to view and/or retrieve the second void pantograph. Operation 410 may be similar in functionality to operation 310 as in FIG. 3.

At operation 412, the server facilitates the authentication of the first void pantograph by transmitting the second void pantograph to the computing device. In one implementation a consumer or user visually inspects patterns of the first void pantograph and the second void pantograph at the computing device to primarily identify whether the first void pantograph and hence the item are authentic. In another implementation, an application associated with the computing device may process the second void pantograph and the first void pantograph to identify whether the patterns within each of the void pantographs are similar or dissimilar. In this implementation, the patterns from each of the void pantographs may go through image comparison such as image alignment and scaling image subtraction, etc.

Figure 5:
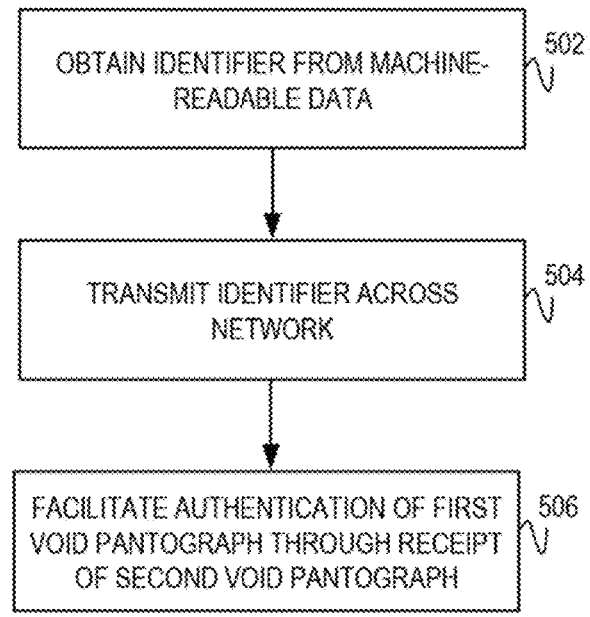
FIG. 5 is flowchart of an example method, executable by a computing device, to obtain an identifier from machine-readable data and transmitting the identifier across a network to a server for identification of a second void pantograph for authenticating a first void pantograph.

FIG. 5 is flowchart of an example method executable by a computing device for obtaining an identifier from machine-readable data and transmitting the identifier across a network to a server. The server in turn identifies a second void pantograph which is made available for the computing device to authenticate the first void pantograph. In discussing FIG. 5, references may be made to the components in FIG. 1A to provide contextual examples. For example, the computing device 102 as in FIG. 1A executes operations 502-506 for receiving the second void pantograph for authentication to the first void pantograph. As such, the computing device includes, by way of example, a processing unit, a controller, a processor, a client device, a target device, a mobile device, tablet, personal computer, etc. Further, although FIG. 5 is described as implemented by the computing device 102, it may be executed on other suitable components. For example, FIG. 5 may be implemented in the form of executable instructions on a machine-readable storage medium 704 as in FIG. 7.

At operation 502, the computing device obtains the identifier from the machine-readable data. The machine-readable data is a machine-readable representation of data relating to an item in which it is attached. As such, the machine-readable data includes at least one of a barcode, label, quick response (QR) code, and a stocking keeping unit (SKU) code. The computing device includes a scanning mechanism in which to scan the machine-readable data for processing. Upon processing the machine-readable data, the computing device obtains the identifier from the machine-readable data. In one implementation, upon scanning the machine-readable data, the computing, device is connected across the network to the server. In this implementation, the server is associated with a website which obtains the identifier from the machine-readable data.

At operation 504, the computing device transmits the identifier obtained from the machine-readable data at operation 502. The identifier is considered associated with the first void pantograph as the association comes from the placement of the first void pantograph relative to the machine-readable data. For example, the first void pantograph may be in a background of the machine-readable data, while in another example the first void pantograph is separate from the machine-readable data. In these examples, the machine-readable data including the identifier and the first void pantograph are related to an item in which a user may choose to identify whether the item is from a trusted source by authenticating the first void pantograph. The identifier contains information which is unique to the second void pantograph thus enabling the server to identify the second void pantograph from the identifier. As such the identifier may include, by way a example, a binary mark, bit string, binary-string embedded print mark, token, value, data value, serial number, universally unique identifier, etc.

At operation 506, the computing device facilitates the authentication of the first void pantograph. Operation 506 includes receiving the second void pantograph and/or a link to the second void pantograph. The server transmits the digital file of the second void pantograph illustrating the image as visible without scanning and/or photocopying. As such, the server generates the digital file of the second void pantograph. In one implementation, operation 506 includes displaying the second void pantograph. In this implementation, the user photocopies or scans the first void pantograph to make the pattern within the first void pantograph as visible. As explained in the next figure, if the void pantographs are similar, this indicates a successful authentication of the first void pantograph, further indicating the first void pantograph is genuine and not counterfeit. If the void pantographs are dissimilar, this indicates the first void pantograph is counterfeit and is not genuine. In another implementation, a measurable image distance may be defined to correspond to a particular statistical certainty that the images are different and thus this may determine the first void pantograph as counterfeit.

Figure 6:
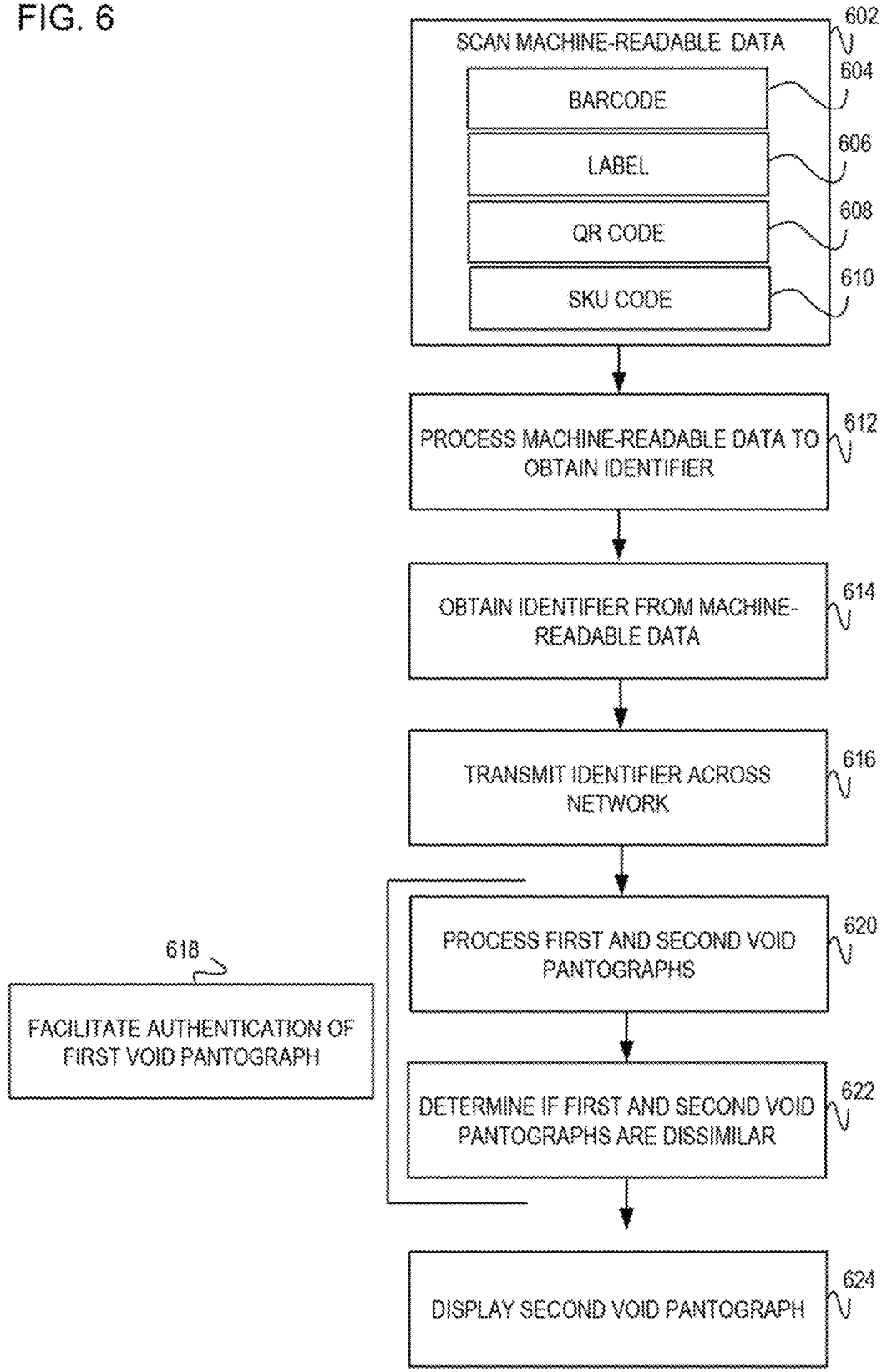
FIG. 6 is a block diagram of an example method executable by a computing device, to scan machine-readable data including a barcode, label, quick response (QR) code, stock keeping unit (SKU) code for transmitting an identifier and receiving a second void pantograph for authentication of a first void pantograph at the computing device.

FIG. 6 is a block diagram of an example method executable by a computing device for authenticating a first void pantograph based upon receiving a second void pantograph. The computing device scans machine-readable data related to an item for obtaining an identifier. The machine-readable data includes at least one of a barcode, label, quick response (QR) code, stock keeping unit (SKU) code as at examples 604-610. As such, the computing device scans at least one of these examples 604-610 for processing. Processing the machine-readable data, the computing device obtains the identifier. The identifier is not readable to a human-eye; thus, to obtain the identifier from the machine-readable data, the computing device processes this data. Upon obtaining the identifier, the computing device transmits the identifier across a network to a server, such as a web service. The web service uses the identifier to obtain the second void pantograph. The computing device receives the second void pantograph and as such facilitates the authentication of the first void pantograph. Facilitating the authentication of the first void pantograph includes processing both the first void pantograph and the second pantograph and determines whether these pantographs are dissimilar. If the pantographs are dissimilar, this indicates the first void pantograph is unauthentic. Having the unauthentic pantograph indicates the pantograph may have been forged and thus may be counterfeit. If the pantographs are similar, this indicates the first void pantograph is genuine and authentic. The authenticated pantograph indicates the item related to the first void pantograph is from a trustworthy source and not counterfeit. In one implementation, upon receiving the second void pantograph as at operation 618, the computing device displays the second void pantograph. In discussing FIG. 6, references may be made to the components in FIG. 1A to provide contextual examples. For example, the computing device 102 as in FIG. 1A executes operations 602-624 for receiving the second void pantograph for authentication to the first void pantograph. As such, the computing device includes, by way of example, a processing unit, a controller, a processor, a client device, a target device, etc. Further, although FIG. 6 is described as implemented by the computing device 102, it may be executed on other suitable components. For example, FIG. 6 may be implemented in the form of executable instructions on a machine-readable storage medium 704 as in FIG. 7.

At operation 602, the computing device scans the machine-readable data. The computing device may include a scanning tool such as a camera or barcode reader to scan the machine-readable data for processing at operation 604. The machine-readable data is readable by the computing device and as such includes an optical image which contains information about the item to which it may be attached. In one implementation, the machine-readable data is included as part of the first void pantograph. In another implementation, the machine-readable data is separate from the machine-readable data. Upon scanning the machine-readable data, the computing device may proceed to operation 612 for processing the machine-readable data. The machine-readable data may include, but is not limited to, at least one of the bar code, the label, the quick response (QR) code, and stock keeping unit (SKU) code as at examples 604-610.

Machine-readable data examples 604-610 include various mechanisms in which data may be represented for scanning and processing by the computing device. At example 604, the bar code is an optical machine-readable representation of data relating to the item. The barcode may be represented by data of varying width and spacing of parallel lines. At example 606, the label represents a visual representation of a graphic. At example 608, the QR code is a type of matrix barcode which includes a machine-readable presentation of data that contains information about the item. At example 610, the SKU code is a unique identifier which is unique for the item to which it ma be attached.

At operation 612, the computing device processes the machine-readable data scanned at operation 602 to obtain the identifier. The identifier is unique to the second void pantograph so by obtaining the identifier and transmitting the identifier, a receiving entity (e.g., web service) may readily identify the particular void pantograph which corresponds to the identifier.

At operation 614, the computing device obtains the identifier information from the machine-readable data. The identifier is unique to the second void pantograph so even if a party attempts to counterfeit the first void pantograph, by using the identifier to obtain the second void pantograph, the computing device may determine whether the first void pantograph is counterfeit. Operation 614 may be similar in functionality to operation 502 as in FIG. 5.

At operation 616, the computing device transmits the identifier obtained at operation 612 across the network to the server. The server uses the identifier to obtain the second void pantograph for transmission to the computing device. Thus, operation 616 includes receiving the second void pantograph from the server for authenticating the first void pantograph as at operation 618. Operation 616 may be similar in functionality to operation 504 as in FIG. 5.

At operation 618, the computing device receives the second void pantograph to authenticate the first void pantograph. The computing device authenticates the first void pantograph by processing the first and second void pantographs and determines if both of these void pantographs are similar as at operation 620-622. If the void pantographs are similar, this indicates the authentication of the first void pantograph. If the void pantographs are dissimilar, this indicates the authentication of the first void pantograph failed. Operation 618 may be similar in functionality to operation 506 as in FIG. 5.

At operation 620, the computing device processes both the first void pantograph and the second void pantograph. Processing the void pantographs may include comparing the first void pantograph and second void pantograph to determine if these pantographs are similar or dissimilar. Operation 620 includes image processing each of the pantographs to identify whether these pantographs are dissimilar.

At operation 622, the computing device compares the first void pantograph and the second void pantograph to determine if the pantographs are dissimilar. If the computing device determines the pantographs are dissimilar, this indicates the first void pantograph is counterfeit and thus the attached item may be unauthentic. If the computing device determines the pantographs are similar, this indicates the first void pantograph is genuine. In one implementation, the second void pantograph received by the server may include a visible pattern without scanning or photocopying the void pantograph. In another implementation, the first void pantograph is scanned or photocopied to make the patterns visible prior to comparing to these patterns.

At operation 624, the computing device displays the second void pantograph. Operation 624 may occur prior to the processing of both of the pantographs as at operation 620.

Figure 7:
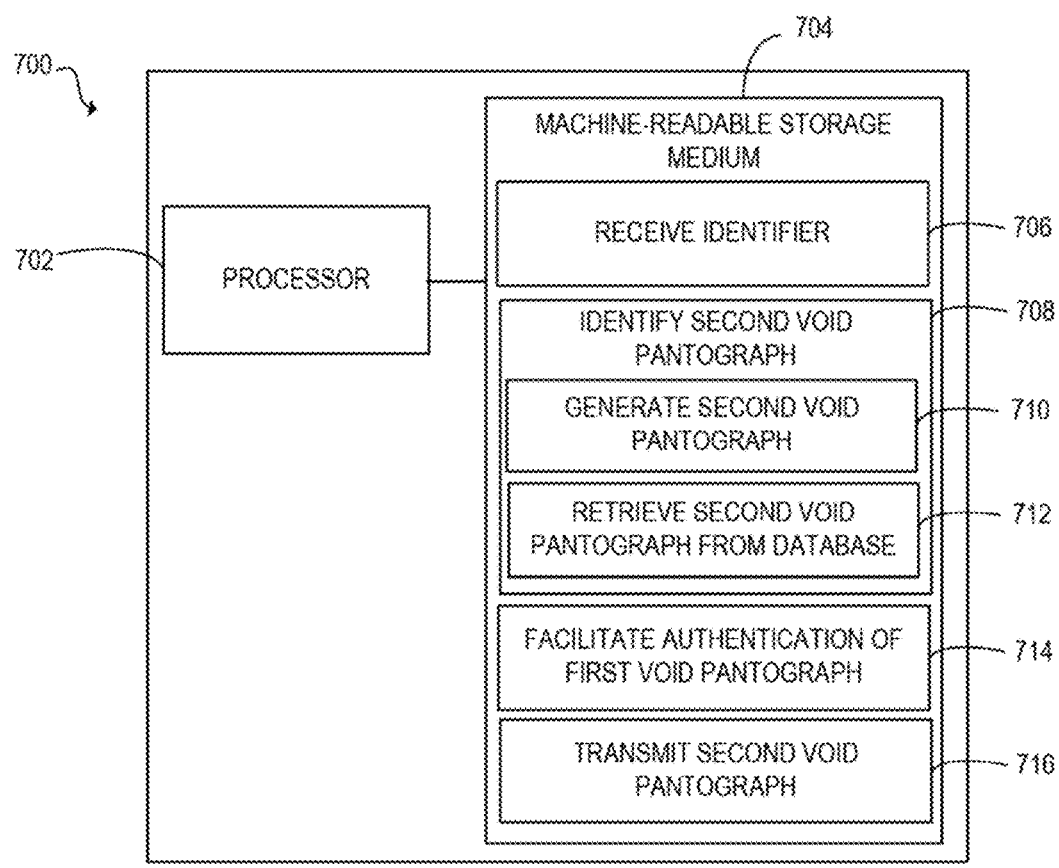
FIG. 7 is a block diagram of an example computing device with a processor to execute instructions in a machine-readable storage medium for obtaining an identifier from a first void pantograph and identifying a second void pantograph for facilitating an authentication or denial of authentication of the first void pantograph.

FIG. 7 is a block diagram of computing device 700 with a processor 702 to execute instructions 706-716 within a machine-readable storage medium 704. Specifically, the computing device 700 with the processor 702 receives an identifier for identifying a second void pantograph for facilitating authentication of a first void pantograph. Upon identifying the second void pantograph, the second void pantograph is transmitted to client device for authentication of the first void pantograph. Although the computing device 700 includes processor 702 and machine-readable storage medium 704, it may also include other components that would be suitable to one skilled in the art. For example, the computing device 700 may include a data storage area for maintaining the second void pantograph. The computing device 700 is an electronic device with the processor 702 capable of executing instructions 706-716, and as such embodiments of the computing device 700 include a server, web service, computing system, web server, network computer, personal computer, desktop computer, laptop, or other type of electronic device capable of executing instructions 706-716. The instructions 706-716 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory.

The processor 702 may fetch, decode, and execute instructions 706-716 to identify the second void pantograph based on the received identifier and transmitting the second void pantograph for authentication of the first void pantograph. In one implementation, upon executing instruction 706, the processor 702 may execute instruction 708 through execution of instruction 710 or 712. In another implementation, upon executing instructions 706-708, the processor 702 may proceed to execute instructions 714-716. Specifically, the processor 702 executes instructions 706-708 to: receive the identifier associated with the first void pantograph; and identify the second void pantograph based on the identifier which is unique to the second void pantograph. The processor 702 may execute instruction 708 through execution of either instruction 710 or instruction 712 to: generate the second void pantograph based on the identifier unique to the second void pantograph; or relieve the second void pantograph from a database. The processor 702 may proceed to execute instructions 714-716 to: facilitate the authentication of the first void pantograph; and transmitting the second void pantograph for the authentication of the first void pantograph.

The machine-readable storage medium 704 includes instructions 706-716 for the processor 702 to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processor 702 to fetch, decode, and/or execute instructions of the machine-readable storage medium 704. The application and/or firmware may be stored on the machine-readable storage medium 704 and/or stored on another location of the computing device 700.

Examples discussed herein provide accessible means to validate an item through authentication of a void pantograph. Additionally, the authentication of the void pantograph provides an anti-counterfeiting measure as a correct combination of the void pantograph and identifier may make it difficult for a would-be counterfeiter to reproduce.

We claim:

1. A method comprising:
   receiving, by a web service server, an identifier from a client device, wherein the identifier is associated with a first void pantograph;
   identifying, by the web service server, a second void pantograph based on the identifier that is received; and
   transmitting, by the web service server, the second void pantograph to the client device to authenticate the first void pantograph by comparing the second void pantograph to the first void pantograph at the client device.

2. The method of claim 1, wherein
   the second void pantograph is constructed from a digital file in such a manner without scanning the second void pantograph,
   wherein the first void pantograph is scanned prior to authentication of the first void pantograph.

3. The method of claim 1, wherein the second void pantograph corresponds to a value unique to the second void pantograph and wherein the identifying the second void pantograph based on the identifier that is received comprises:
   retrieving, from a database of multiple void pantographs, the second void pantograph in accordance with the value unique to the second void pantograph.

4. The method of claim 1, wherein the first void pantograph is counterfeit when the first void pantograph and the second void pantograph are dissimilar.

5. The method of claim 1, wherein the identifier that is received includes a value unique to the second void pantograph and wherein the identifying the second void pantograph based on the identifier that is received comprises:
   generating the second void pantograph based on the value unique to the second void pantograph.

6. The method of claim 1, wherein the first void pantograph is processed on the client device that is different from the web service server that identifies the second void pantograph.

7. A method comprising:
   obtaining, by a target device, an identifier from machine-readable data associated with a first void pantograph;
   transmitting, by the target device, the identifier across a network to a web service server for an identification of a second void pantograph at the web service server based on the identifier, wherein the second void pantograph is unique to the identifier;
   receiving, by the target device, from the web service server the second void pantograph; and comparing, by the target device, the second void pantograph to the first void pantograph to authenticate the first void pantograph.

8. The method of claim 7 comprising:
scanning the machine-readable data; and
processing the machine-readable data by the target device to obtain the identifier.

9. The method of claim 7, further comprising:
determining that the first void pantograph is counterfeit when the first void pantograph and the second void pantograph are dissimilar.

10. The method of claim 7, wherein the machine-readable data includes at least one of a barcode, a label, a quick response (QR) code, and a stock keeping unit (SKU) code.

11. The method of claim 7 comprising:
receiving the second void pantograph for authentication of the first void pantograph, wherein the first void pantograph is scanned prior to authentication while the second void pantograph is not scanned prior to authentication; and
displaying the second void pantograph on a computing device.

12. A non-transitory machine-readable storage medium comprising instructions that when executed by a processing resource cause a computing device to:

receive an identifier from a client device, wherein the identifier is associated with a first void pantograph;
identify, by the processing resource, a second void pantograph based on the identifier that is received, where the identifier that is received is unique to the second void pantograph; and
transmit, by the processing resource, the second void pantograph to the client device to authenticate the first void pantograph by comparing the second void pantograph to the first void pantograph at the client device.

13. The non-transitory machine-readable storage medium of claim 12, wherein to identify the second void pantograph based on the identifier that is received comprises instructions that when executed by the processing resource cause the computing device to:
generate the second void pantograph based on the identifier that is received.

14. The non-transitory machine-readable storage medium of claim 12, wherein to identify the second void pantograph based on the identifier that is received comprises instructions that when executed by the processing resource cause the computing device to:
retrieve from a database of multiple void pantographs, the second void pantograph in accordance with the identifier that is received.

* * * * *